United States Patent
Chen (10) Patent No.: US 10,049,024 B2
(45) Date of Patent: Aug. 14, 2018

(54) DATA PROCESSING METHOD, DEVICE, AND SYSTEM FOR STORAGE UNIT

(71) Applicant: Huawei Technologies Co., Ltd., Shenzhen (CN)

(72) Inventor: Zhongping Chen, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 103 days.

(21) Appl. No.: 15/160,129

(22) Filed: May 20, 2016

(65) Prior Publication Data

US 2016/0266988 A1 Sep. 15, 2016

Related U.S. Application Data

(63) Continuation of application No. PCT/CN2014/078079, filed on May 22, 2014.

(30) Foreign Application Priority Data

Nov. 22, 2013 (CN) .......................... 2013 1 0600884

(51) Int. Cl.
*G06F 11/00* (2006.01)
*G06F 11/20* (2006.01)
*G06F 11/16* (2006.01)

(52) U.S. Cl.
CPC ........ *G06F 11/2033* (2013.01); *G06F 11/201* (2013.01); *G06F 11/2069* (2013.01);
(Continued)

(58) Field of Classification Search
CPC ............... G06F 11/201; G06F 11/2069; G06F 11/2071; G06F 11/2092; G06F 11/2094
See application file for complete search history.

(56) References Cited

U.S. PATENT DOCUMENTS 5,913,927 A 6/1999 Nagaraj et al.
8,825,968 B2 * 9/2014 Tamura .................. G06F 12/00
711/154
(Continued)

FOREIGN PATENT DOCUMENTS

CN 1588547 A 3/2005
CN 101097531 A 1/2008
(Continued)

OTHER PUBLICATIONS

Foreign Communication From a Counterpart Application, European Application No. 14864210.1, Extended European Search Report dated Oct. 24, 2016, 7 pages.
(Continued)

*Primary Examiner* — Charles Ehne
(74) *Attorney, Agent, or Firm* — Conley Rose, P.C.

(57) ABSTRACT

A data processing method, a device, and a system for a storage unit in order to avoid performing repeated data read operations on the storage unit where the method includes recording, by a first server for at least one storage unit used to store data, information about a storage unit in which a repairable fault occurs but repairing fails, querying, by the first server each time a request for reading data is received, whether the storage unit corresponding to the recorded information about the storage unit stores a part or all of the data, and when the storage unit corresponding to the recorded information stores the data, returning, to a requesting party that sends the request, a message indicating that reading the data fails, or otherwise, reading the data from a storage unit that stores the data, and feeding back the data to the requesting party that sends the request.

20 Claims, 4 Drawing Sheets

A first server records, for at least one storage unit used to store data, information about a storage unit in which a repairable fault occurs but repairing fails — S101

Each time the first server receives a request for reading data, the first server queries whether the storage unit corresponding to the recorded information about the storage unit stores a part or all of the data; and if yes, returns, to a requesting party that sends the request, a message indicating that reading the data fails; or otherwise, reads the data from a storage unit that stores the data, and feeds back the data to a requesting party that sends the request — S102

(52) U.S. Cl.
CPC ...... *G06F 11/2092* (2013.01); *G06F 11/2094* (2013.01); *G06F 11/1662* (2013.01); *G06F 2201/805* (2013.01)

(56) References Cited

U.S. PATENT DOCUMENTS

| | | | | |
|---|---|---|---|---|
| 8,904,139 | B2* | 12/2014 | Fleming | G06F 9/455 |
| | | | | 711/165 |
| 8,958,429 | B2* | 2/2015 | Shukla | H04L 45/24 |
| | | | | 370/216 |
| 2002/0169996 | A1 | 11/2002 | King et al. | |
| 2004/0019821 | A1* | 1/2004 | Chu | G06F 11/2092 |
| | | | | 714/6.22 |
| 2004/0039981 | A1 | 2/2004 | Riedl et al. | |
| 2005/0114741 | A1* | 5/2005 | Chen | G06F 11/0727 |
| | | | | 714/6.23 |
| 2009/0292960 | A1 | 11/2009 | Haraden et al. | |
| 2010/0122051 | A1* | 5/2010 | Maki | G06F 11/201 |
| | | | | 711/162 |
| 2011/0202813 | A1* | 8/2011 | Resnick | G06F 11/1004 |
| | | | | 714/748 |

FOREIGN PATENT DOCUMENTS

| | | |
|---|---|---|
| CN | 101276302 A | 10/2008 |
| CN | 103064759 A | 4/2013 |
| CN | 103647804 A | 3/2014 |

OTHER PUBLICATIONS

Partial English Translation and Abstract of Chinese Patent Application No. CN1588547, May 16, 2016, 4 pages.
Partial English Translation and Abstract of Chinese Patent Application No. CN103647804, May 16, 2016, 3 pages.
Foreign Communication From a Counterpart Application, Chinese Application No. 201310600884.X, Chinese Office Action dated Apr. 19, 2016, 7 pages.
Foreign Communication From a Counterpart Application, PCT Application No. PCT/CN2014/078079, English Translation of International Search Report dated Jul. 22, 2014, 2 pages.
Foreign Communication From a Counterpart Application, PCT Application No. PCT/CN2014/078079, English Translation of Written Opinion dated Jul. 23, 2014, 12 pages.

* cited by examiner

DATA PROCESSING METHOD, DEVICE, AND SYSTEM FOR STORAGE UNIT

CROSS-REFERENCE TO RELATED APPLICATIONS

This application is a continuation of International Application No. PCT/CN2014/078079, filed on May 22, 2014, which claims priority to Chinese Patent Application No. 201310600884.X, filed on Nov. 22, 2013, both of which are hereby incorporated by reference in their entireties.

TECHNICAL FIELD

The present disclosure relates to the field of electronic computer technologies, and in particular, to a data processing method, device, and system for a storage unit.

BACKGROUND

In an existing storage system, a hard disk drive (HDD) and a solid state disk (SSD) are generally used as storage media. Faults that may occur in such storage medium include some repairable faults, such as a check error (UNC) and a sector identifier error (IDNF). A repairable fault may generally be repaired by rewriting new data.

For a distributed storage system in which data has backup data, the backup data is distributed in different servers. If a repairable fault such as a UNC or IDNF occurs in a primary server, the primary server requests a secondary server that stores backup data of a faulty area to send the backup data, and overwrites the faulty area with the received backup data to complete fault repairing. Similarly, if a repairable fault such as a UNC or IDNF occurs in a secondary server, the secondary server sends a request to a corresponding primary server, and completes fault repairing according to backup data received from the primary server. However, when a fault occurs in same backup data in both the primary server and the secondary server, repairing of a faulty area cannot be completed.

In a case in which repairing cannot be completed, the primary server or the secondary server may re-receive a request for reading data in the faulty area, re-schedule an operating system (OS) input/output (IO) channel to access the faulty area in a disk, further re-start a fault repairing process, and then return that fault repairing fails. Repeated IO scheduling and repairing processes waste a large number of system resources.

SUMMARY

Embodiments of the present disclosure provide a data processing method, device, and system for a storage unit in order to solve a problem that repeated IO scheduling and repairing processes waste a system resource when a fault occurs in same backup data in both a primary server and a secondary server.

Specific technical solutions provided in the embodiments of the present disclosure are as follows.

According to a first aspect, a data processing method for a storage unit is provided, where the method includes recording, by a first server for at least one storage unit used to store data, information about a storage unit in which a repairable fault occurs but repairing fails, querying, each time the first server receives a request for reading data, whether the storage unit corresponding to the recorded information about the storage unit stores a part or all of the data, and if yes, returning, to a requesting party that sends the request, a message indicating that reading the data fails, or otherwise, reading the data from a storage unit that stores the data, and feeding back the data to a requesting party that sends the request.

With reference to the first aspect, in a first possible implementation manner, recording, by a first server, information about a storage unit in which a repairable fault occurs but repairing fails includes sending, by the first server, a message to a second server in order to request the second server to read backup data of data stored in a storage unit that is in the first server and in which a repairable fault occurs, determining, after the first server receives a message that the second server returns when failing to read the backup data, that repairing fails in the storage unit in which the repairable fault occurs, and recording, by the first server, the information about the storage unit in which the repairable fault occurs.

With reference to the first possible implementation manner of the first aspect, in a second possible implementation manner, the first server determines, in the following manner, a storage unit in which a repairable fault occurs: receiving, by the first server, a request for reading data, accessing, by the first server through an OS IO channel, a storage unit in which the data requested to be read is located, and determining, by the first server according to a message reported by the OS IO channel, a storage unit in which a repairable fault occurs in the storage unit in which the data requested to be read is located.

With reference to the second possible implementation manner of the first aspect, in a third possible implementation manner, the message reported by the OS IO channel includes a bitmap corresponding to the storage unit in which the repairable fault occurs, and error code of the repairable fault.

With reference to the first aspect, in a fourth possible implementation manner, recording, by a first server, information about a storage unit in which a repairable fault occurs but repairing fails includes setting, by the first server, a bit in a bad sector table (BST) of memory to 1, where the bit corresponds to the storage unit in which the repairable fault occurs but repairing fails.

With reference to the fourth possible implementation manner of the first aspect, in a fifth possible implementation manner, the method further includes storing, by the first server, the BST of the memory into a hard disk.

With reference to the first aspect or any one of the first possible implementation manner to the fifth possible implementation manner of the first aspect, in a sixth possible implementation manner, the repairable fault includes a check error and/or a sector identifier error.

With reference to the first aspect, in a seventh possible implementation manner, the method further includes determining, each time the first server receives a request for writing data, information about a storage unit into which the data is to be written, deleting, when the first server determines that the recorded information about the storage unit includes the information about the storage unit into which the data is to be written, the recorded information about the storage unit into which the data is to be written, and writing the data into the storage unit into which the data is to be written.

With reference to the first aspect, in an eighth possible implementation manner, the method further includes querying, when the first server determines to send data to any server, whether the storage unit corresponding to the recorded information about the storage unit stores a part or all of the data that is to be sent, and if yes, sending, by the first server, an indication message to a server of a receiving party in order to indicate that a repairable fault occurs but repairing fails in the storage unit that stores the part or all of the data that is to be sent, or otherwise, sending, by the first server to a server of a receiving party, the data that is to be sent.

With reference to the first aspect, in a ninth possible implementation manner, the method further includes determining, when the first server determines to receive data sent by any server, if a message that is sent by a server of a sending party and indicates that a repairable fault occurs but repairing fails in a storage unit that is of the server of the sending party and stores a part or all of the data is received, the storage unit used to store the part or all of the data, and locally recording information about the storage unit used to store the part or all of the data.

According to a second aspect, a server device is provided, where the device includes a recording unit configured to record, for at least one storage unit used to store data, information about a storage unit in which a repairable fault occurs but repairing fails, and a read request processing unit configured to query, each time a request for reading data is received, whether the storage unit corresponding to the recorded information about the storage unit stores a part or all of the data, and if yes, return, to a requesting party that sends the request, a message indicating that reading the data fails, or otherwise, read the data from a storage unit that stores the data, and feedback the data to a requesting party that sends the request.

With reference to the second aspect, in a first possible implementation manner, the recording unit includes a fault determining unit configured to determine a local storage unit in which a repairable fault occurs, a message sending unit configured to send a message to another server in order to request the other server to read backup data of data stored in the storage unit in which the repairable fault occurs, a message processing unit configured to determine, after a message that the other server returns when failing to read the backup data is received, that repairing fails in the storage unit in which the repairable fault occurs, and an information recording unit configured to record the information about the storage unit in which the repairable fault occurs.

With reference to the first possible implementation manner of the second aspect, in a second possible implementation manner, the fault determining unit is further configured to receive a request for reading data, access, through an OS IO channel, a storage unit in which the data requested to be read is located, and determine, according to a message reported by the OS IO, a storage unit in which a repairable fault occurs in the storage unit in which the data requested to be read is located.

With reference to the second possible implementation manner of the second aspect, in a third possible implementation manner, the message that is reported by the OS IO channel and received by the fault determining unit includes a bitmap corresponding to the storage unit in which the repairable fault occurs, and error code of the repairable fault.

With reference to the second aspect, in a fourth possible implementation manner, when the recording unit is configured to record the information about the storage unit in which the repairable fault occurs but repairing fails, the recording unit is further configured to set a bit in a BST of memory to 1, where the bit corresponds to the storage unit in which the repairable fault occurs but repairing fails.

With reference to the fourth possible implementation manner of the second aspect, in a fifth possible implementation manner, the device further includes a BST storage unit configured to store the BST of the memory into a hard disk.

With reference to the second aspect or any one of the first possible implementation manner to the fifth possible implementation manner of the second aspect, in a sixth possible implementation manner, the repairable fault that occurs in the storage unit corresponding to the information that is about the storage unit and recorded by the recording unit includes a check error and/or a sector identifier error.

With reference to the second aspect, in a seventh possible implementation manner, the device further includes a write request processing unit configured to determine, each time a request for writing data is received, information about a storage unit into which the data is to be written, delete, when it is determined that the recorded information about the storage unit includes the information about the storage unit into which the data is to be written, the recorded information about the storage unit into which the data is to be written, and write the data into the storage unit into which the data is to be written.

With reference to the second aspect, in an eighth possible implementation manner, the device further includes an indication unit configured to query, when it is determined to send data to any server, whether the storage unit corresponding to the recorded information about the storage unit stores a part or all of the data that is to be sent, and if yes, send an indication message to a server of a receiving party in order to indicate that a repairable fault occurs but repairing fails in the storage unit that stores the part or all of the data that is to be sent, or otherwise, send, to a server of a receiving party, the data that is to be sent.

With reference to the second aspect, in a ninth possible implementation manner, the device further includes an indication receiving unit configured to determine, when it is determined to receive data sent by any server, if a message that is sent by a server of a sending party and indicates that a repairable fault occurs but repairing fails in a storage unit that is of the server of the sending party and stores a part or all of the data is received, the storage unit used to store the part or all of the data, and locally record information about the storage unit used to store the part or all of the data.

According to a third aspect, a server device is provided, where the device includes a processor configured to record, for at least one storage unit used to store data, information about a storage unit in which a repairable fault occurs but repairing fails, query, each time a request for reading data is received, whether the storage unit corresponding to the recorded information about the storage unit stores a part or all of the data, and if yes, return, to a requesting party that sends the request, a message indicating that reading the data fails, or otherwise, read the data from a storage unit that stores the data, and feedback the data to a requesting party that sends the request.

With reference to the third aspect, in a first possible implementation manner, the device further includes a transmission module, and when the processor is configured to record the information about the storage unit in which the repairable fault occurs but repairing fails, the processor is further configured to determine a local storage unit in which a repairable fault occurs, send a message to another server in order to request the other server to read backup data of data stored in the storage unit in which the repairable fault occurs, determine, after a message that the other server returns when failing to read the backup data is received, that repairing fails in the storage unit in which the repairable fault occurs, and record the information about the storage unit in which the repairable fault occurs.

With reference to the first possible implementation manner of the third aspect, in a second possible implementation manner, when the processor is configured to determine the local storage unit in which the repairable fault occurs, the processor is further configured to receive a request for reading data, access, through an OS IO channel, a storage unit in which the data requested to be read is located, and determine, according to a message reported by the OS IO, a storage unit in which a repairable fault occurs in the storage unit in which the data requested to be read is located.

With reference to the second possible implementation manner of the third aspect, in a third possible implementation manner, the message that is reported by the OS IO channel and received by the processor includes a bitmap corresponding to the storage unit in which the repairable fault occurs, and error code of the repairable fault.

With reference to the third aspect, in a fourth possible implementation manner, the device further includes memory, and when the processor is configured to record the information about the storage unit in which the repairable fault occurs but repairing fails, the processor is further configured to set a bit in a BST of the memory to 1, where the bit corresponds to the storage unit in which the repairable fault occurs but repairing fails.

With reference to the fourth possible implementation manner of the third aspect, in a fifth possible implementation manner, the device further includes a hard disk, and the processor is further configured to store the BST of the memory into the hard disk.

With reference to the third aspect or any one of the first possible implementation manner to the fifth possible implementation manner of the third aspect, in a sixth possible implementation manner, the repairable fault that occurs in the storage unit corresponding to the information that is about the storage unit and recorded by the processor includes a check error and/or a sector identifier error.

With reference to the third aspect, in a seventh possible implementation manner, the processor is further configured to determine, each time a request for writing data is received, information about a storage unit into which the data is to be written, delete, when it is determined that the recorded information about the storage unit includes the information about the storage unit into which the data is to be written, the recorded information about the storage unit into which the data is to be written, and write the data into the storage unit into which the data is to be written.

With reference to the third aspect, in an eighth possible implementation manner, the processor is further configured to query, when it is determined to send data to any server, whether the storage unit corresponding to the recorded information about the storage unit stores a part or all of the data that is to be sent, and if yes, send an indication message to a server of a receiving party in order to indicate that a repairable fault occurs but repairing fails in the storage unit that stores the part or all of the data that is to be sent, or otherwise, send, to a server of a receiving party, the data that is to be sent.

With reference to the third aspect, in a ninth possible implementation manner, the processor is further configured to determine, when it is determined to receive data sent by any server, if a message that is sent by a server of a sending party and indicates that a repairable fault occurs but repairing fails in a storage unit that is of the server of the sending party and stores a part or all of the data is received, the storage unit used to store the part or all of the data, and locally record information about the storage unit used to store the part or all of the data.

According to a fourth aspect, a distributed storage system, including at least a first server configured to record, for at least one storage unit used to store data, information about a storage unit in which a repairable fault occurs but repairing fails, query, each time a request for reading data is received, whether the storage unit corresponding to the recorded information about the storage unit stores a part or all of the data, and if yes, return, to a requesting party that sends the request, a message indicating that reading the data fails, or otherwise, read the data from a storage unit that stores the data, and feed the data back to a requesting party that sends the request.

With reference to the fourth aspect, in a first possible implementation manner, for each first server, a second server corresponding to the first server exists in the system, and when the first server is configured to record the information about the storage unit in which the repairable fault occurs but repairing fails, the first server is further configured to send a message to the second server in order to request the second server to read backup data of data stored in a storage unit that is in the first server and in which a repairable fault occurs, determine, after a message that the second server returns when failing to read the backup data is received, that repairing fails in the storage unit in which the repairable fault occurs, and record the information about the storage unit in which the repairable fault occurs.

With reference to the fourth aspect or the first possible implementation manner of the fourth aspect, in a second possible implementation manner, the repairable fault that occurs in the storage unit corresponding to the information that is about the storage unit and recorded by the first server includes a check error and/or a sector identifier error.

With reference to the fourth aspect, in a third possible implementation manner, the first server is further configured to query, when it is determined to send data to any server, whether the storage unit corresponding to the recorded information about the storage unit stores a part or all of the data that is to be sent, and if yes, send an indication message to a server of a receiving party in order to indicate that a repairable fault occurs but repairing fails in the storage unit that stores the part or all of the data that is to be sent, or otherwise, send, to a server of a receiving party, the data that is to be sent.

With reference to the fourth aspect, in a fourth possible implementation manner, the first server is further configured to determine, when it is determined to receive data sent by any server, if a message that is sent by a server of a sending party and indicates that a repairable fault occurs but repairing fails in a storage unit that is of the server of the sending party and stores a part or all of the data is received, the storage unit used to store the part or all of the data, and locally record information about the storage unit used to store the part or all of the data.

According to the embodiments of the present disclosure, a first server records, for at least one storage unit used to store data, information about a storage unit in which a repairable fault occurs but repairing fails. Each time the first server receives a request for reading data, the first server queries whether the storage unit corresponding to the recorded information about the storage unit stores a part or all of the data, and if yes, the first server returns, to a requesting party that sends the request, a message indicating that reading the data fails, or otherwise, the first server reads the data from a storage unit that stores the data, and feeds back the data to a requesting party that sends the request. Information of a storage unit in which a repairable fault occurs but repairing fails is recorded, and recorded information about the storage unit is queried before data is read each time, thereby avoiding performing repeated and ineffective repairing on the storage unit in which the repairable fault occurs, making a data read mechanism of the storage unit more proper, and saving a system resource.

DESCRIPTION OF EMBODIMENTS

Embodiments of the present disclosure provide a data processing method, device, and system for a storage unit in order to avoid performing repeated and ineffective repairing on a storage unit in which a repairable fault occurs, and save a system resource.

Figure 1:
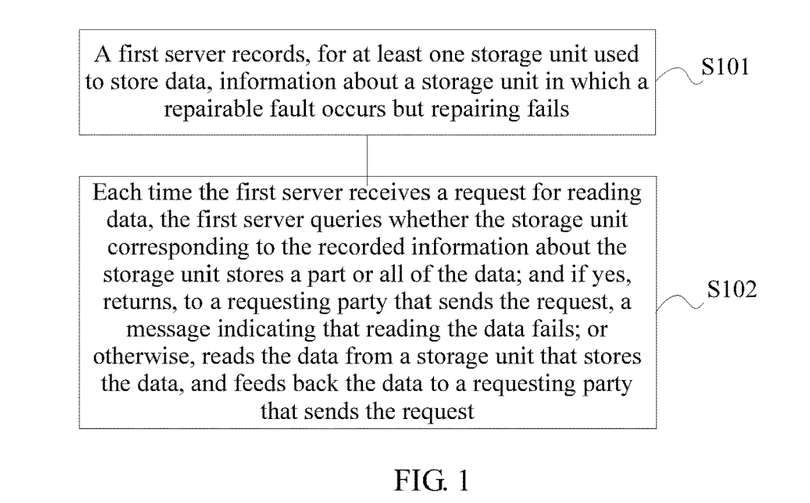
FIG. 1 is a schematic flowchart of a data processing method for a storage unit according to an embodiment of the present disclosure.

Referring to FIG. 1, a data processing method for a storage unit according to an embodiment of the present disclosure includes the following steps.

Step S101: A first server records, for at least one storage unit used to store data, information about a storage unit in which a repairable fault occurs but repairing fails.

After an OS IO channel reports that a repairable fault occurs in a storage unit, the first server attempts to acquire backup data stored in another server in order to repair the fault. If the repairing process fails, information about this type of storage unit is recorded.

The repairable fault includes IDNF and/or a UNC.

Step S102: Each time the first server receives a request for reading data, the first server queries whether the storage unit corresponding to the recorded information about the storage unit stores a part or all of the data, and if yes, returns, to a requesting party that sends the request, a message indicating that reading the data fails, or otherwise, reads the data from a storage unit that stores the data, and feeds back the data to a requesting party that sends the request.

The request for reading data comes from a user, or comes from a local background program, or comes from another computer in a distributed storage system.

Before a system resource is invoked to access a storage medium, whether it is recorded that a repairable fault occurs but repairing fails in a storage unit is queried. In this way, repeated repairing for a storage unit can be avoided and a system resource is saved.

Preferably, that the first server records the information about the storage unit in which the repairable fault occurs but repairing fails in step S101 includes the following. The first server sends a message to a second server in order to request the second server to read backup data of data stored in a storage unit that is in the first server and in which a repairable fault occurs. After the first server receives a message that the second server returns when failing to read the backup data, the first server determines that repairing fails in the storage unit in which the repairable fault occurs, and the first server records the information about the storage unit in which the repairable fault occurs.

Preferably, the first server determines, in the following manner, a storage unit in which a repairable fault occurs. The first server receives a request for reading data. The first server accesses, through an OS IO channel, a storage unit in which the data requested to be read is located, and the first server determines, according to a message reported by the OS IO, a storage unit in which a repairable fault occurs in the storage unit in which the data requested to be read is located. In the prior art, when a storage unit in which any fault occurs is accessed through an OS IO channel, the OS IO channel reports error input/output (EIO), but a user layer cannot learn whether the fault that occurs in the storage unit is a repairable fault, which is not beneficial for the user layer to perform proper fault processing. Therefore, in this embodiment of the present disclosure, a specific type of a fault that is in a storage unit and can be reported by the OS IO channel is defined. In this way, the user layer can determine, according to a message reported by the OS IO channel, a storage unit in which a repairable fault occurs, and then, for the storage unit in which the repairable fault occurs, sends a message to another server in order to request to transmit backup data for fault repairing. However, for a storage unit that is determined according to a message reported by the OS IO channel and in which an irreparable fault such as a hardware damage occurs, the user layer does not perform repairing processing.

Preferably, a reporting manner of the OS IO channel is improved as follows. A message reported by the OS IO channel indicates a bitmap corresponding to the storage unit in which the fault occurs, and indicates error code of the fault. The bitmap is used to determine a location of the storage unit, and the error code is used to determine a specific fault type, and a UNC and IDNF each have corresponding error code.

Preferably, recording the information about the storage unit in which the repairable fault occurs but repairing fails includes the following. The first server sets a bit in a BST of memory to 1, where the bit corresponds to the storage unit in which the repairable fault occurs but repairing fails. Furthermore, one bit of unsigned integer 32 (UINT 32) data may be used to mark one storage unit. For an HDD, a storage unit is a sector, and 2048 (=64×32) sectors corresponding to 1 megabyte (MB) storage space may be indicated using values of 64 pieces of UINT 32. Each bit is 0 initially, and if a repairable fault occurs but repairing fails in a sector, a bit corresponding to the sector is set to 1.

Preferably, when a specific trigger condition is met, the first server stores the BST of the memory into a hard disk. For example, the BST is stored into the hard disk at a fixed time point, or when the BST is updated, the BST is synchronized to the hard disk. Each time the memory is powered off, a computer reads the BST from the hard disk. In this way, a loss of a record in the BST can be avoided.

Preferably, this embodiment further provides a method for writing data into a storage unit, where the method further includes the following.

Each time the first server receives a request for writing data, the first server determines a storage unit into which the data is to be written. The first server queries whether the storage unit corresponding to the recorded information about the storage unit includes the storage unit into which the data is to be written, and if yes, the first server deletes a record of information about the storage unit into which the data is to be written, and writes the data into the storage unit into which the data is to be written, or otherwise, the first server writes the data into the storage unit into which the data is to be written.

In this way, newly written data can be normally read.

When a server is added to or removed from a distributed storage system, a rebalance process needs to be performed between servers. Load of each server is balanced by transferring stored data. In a data transferring process, a server of a sending party needs to indicate data in a recorded storage unit in which a repairable fault occurs but repairing fails, and a server of a receiving party also needs to record a corresponding local storage unit in order to avoid transmitting and reading erroneous data, and ensure data consistency.

Furthermore, when the first server determines to send data to any server, the first server queries whether the storage unit corresponding to the recorded information about the storage unit stores a part or all of the data that is to be sent, and if yes, the first server sends an indication message to the server of the receiving party in order to indicate that a repairable fault occurs but repairing fails in the storage unit that stores the part or all of the data that is to be sent, or otherwise, the first server sends, to the server of the receiving party, the data that is to be sent.

When the first server determines to receive data sent by any server, if a message that is sent by a server of a sending party and indicates that a repairable fault occurs but repairing fails in a storage unit that is of the server of the sending party and stores a part or all of the data is received, the first server locally records information about the storage unit corresponding to the part or all of the data, for example, does not receive invalid data in a storage unit recorded by a BST of the server of the sending party, locally reserves only storage space of a same size as the invalid data for the invalid data, and records the storage space into a local BST.

In the following, the method provided in this embodiment of the present disclosure is described in detail with reference to an actual application scenario.

Figure 2:
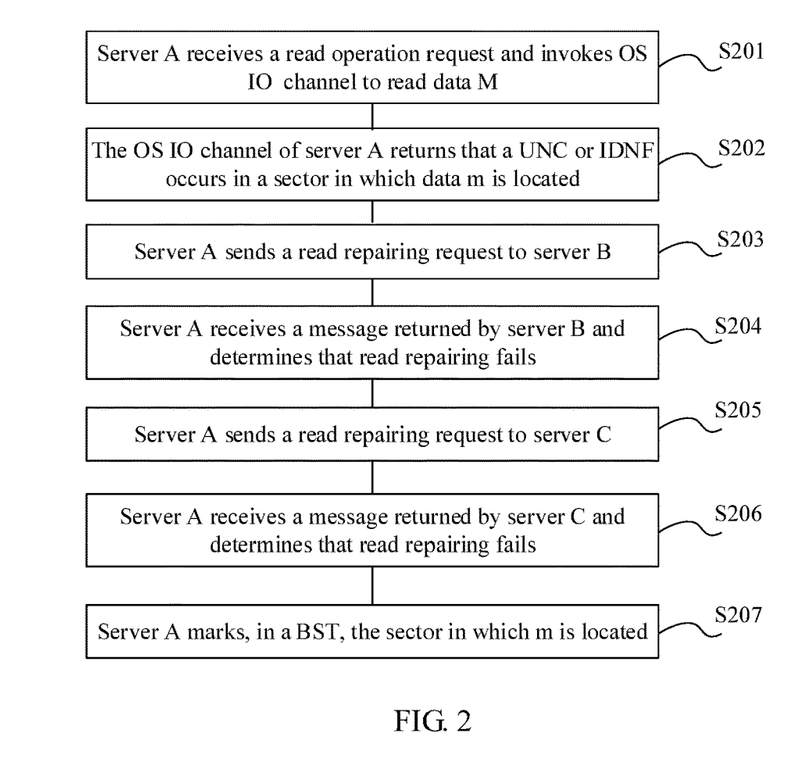
FIG. 2 is a schematic flowchart of a fault processing method for a storage unit according to a specific embodiment of the present disclosure.

Scenario 1: A piece of data M exists in all servers A, B, and C, and m is a segment of data in M and occupies an entire sector in server A. A is a primary server, B and C are secondary servers, and a BST is maintained in server A. As shown in FIG. 2, fault processing in a storage unit of server A includes the following process.

Step S201: Server A receives a read operation request and invokes OS IO channel to read data M.

Step S202: The OS IO channel of server A returns that a UNC or IDNF occurs in the sector in which data m is located.

Step S203: Server A sends a read repairing request to server B, and server B reads data m, and OS IO channel of server B returns a UNC or IDNF.

Step S204: Server A receives a message returned by server B and determines that read repairing fails.

Step S205: Server A sends a read repairing request to server C, and server C reads data m, and OS IO channel of server C returns a UNC or IDNF.

Step S206: Server A receives a message returned by server C and determines that read repairing fails.

Step S207: Server A marks, in the BST, the sector in which m is located.

When re-receiving a request for reading data M, server A first queries the BST and finds that data m has been marked in the BST, and returns that reading data M fails. When receiving a request for writing data, server A first queries the BST and finds that the sector in which m is located has been marked in the BST, cancels a mark of the sector in which m is located in the BST, and then writes the data into the sector in which m is located.

Figure 3:
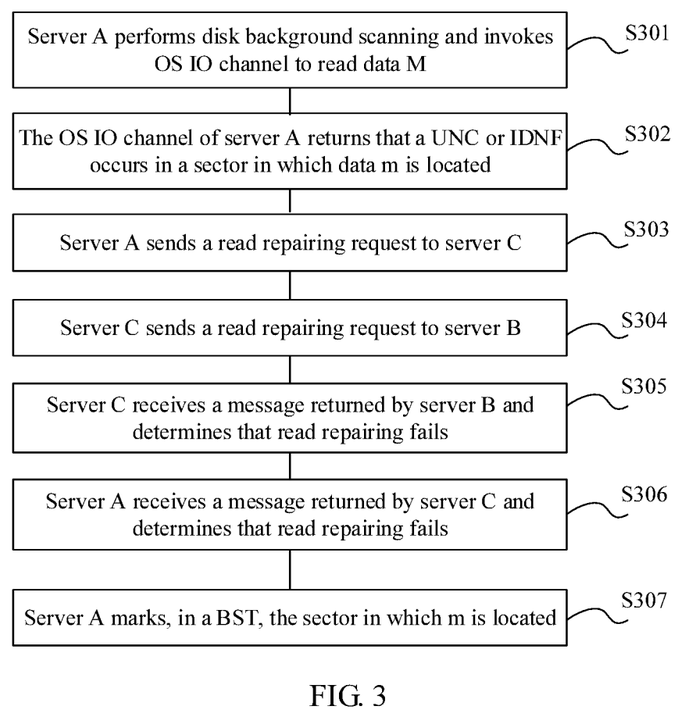
FIG. 3 is a schematic flowchart of a fault processing method for a storage unit according to another specific embodiment of the present disclosure.

Scenario 2: A piece of data M exists in all servers A, B, and C, and m is a segment of data in M and occupies an entire sector in server A. C is a primary server, A and B are secondary servers, and a BST is maintained in server A. As shown in FIG. 3, fault processing in a storage unit of server A includes the following process.

Step S301: Server A performs disk background scanning and invokes OS IO channel to read data M.

Step S302: The OS IO channel of server A returns that a UNC or IDNF occurs in the sector in which data m is located.

Step S303: Server A sends a read repairing request to server C, and server C reads data m, and OS IO channel of server C returns a UNC or IDNF.

Step S304: Server C sends a read repairing request to server B, and server B reads data m, and OS IO channel of server B returns a UNC or IDNF.

Step S305: Server C receives a message returned by server B and determines that read repairing fails.

Step S306: Server A receives a message returned by server C and determines that read repairing fails.

Step S307: Server A marks, in the BST, the sector in which data m is located.

When re-performing a data read operation such as disk background scanning, server A first queries the BST and finds that data m has been marked in the BST, and returns that reading data M fails. When receiving a request for writing data, server A first queries the BST and finds that the sector in which m is located has been marked in the BST, cancels the mark of the sector in which m is located in the BST, and then writes the data into the sector in which m is located.

Figure 4:
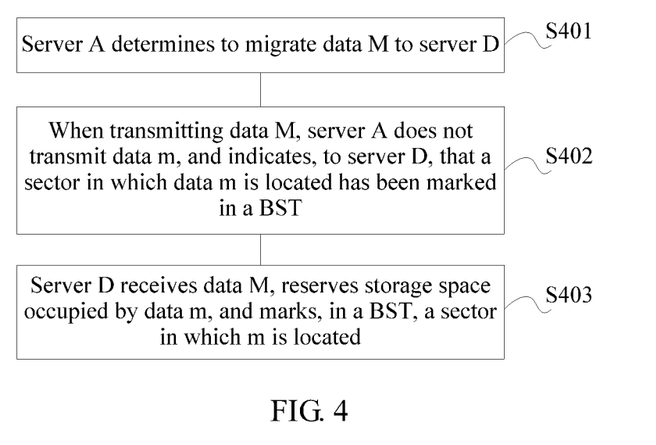
FIG. 4 is a schematic flowchart of a data migration method for a storage unit according to another specific embodiment of the present disclosure.

Scenario 3: A piece of data M exists in all servers A, B, and C, m is a segment of data in M and occupies an entire sector in A, and the sector in which m is located has been marked in a BST of A. In this case, server D is added in order to share storage load of servers A, B, and C. As shown in FIG. 4, rebalance of a distributed storage system includes the following process.

Step S401: Server A determines to migrate data M to server D.

Step S402: When transmitting data M, server A does not transmit data m, and indicates, to server D, that the sector in which data m is located has been marked in the BST.

Step S403: Server D receives data M, reserves storage space occupied by data m, and marks, in the BST, the sector in which m is located.

When reading data M, server D first queries the BST and finds that data m has been marked in the BST, and returns that reading data M fails. When receiving a request for writing data, server D first queries the BST and finds that the sector in which m is located has been marked in the BST, cancels the mark of the sector in which m is located in the BST, and then writes the data into the sector in which m is located.

Figure 5:
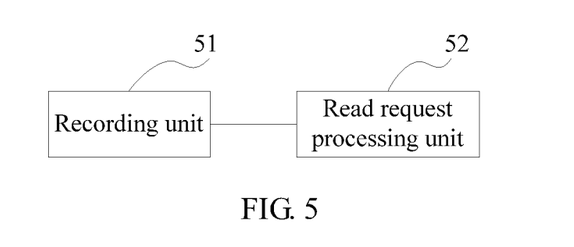
FIG. 5 is a schematic structural diagram of a server device according to an embodiment of the present disclosure.

Referring to FIG. 5, a server device provided in an embodiment of the present disclosure includes a recording unit 51 configured to record, for at least one storage unit used to store data, information about a storage unit in which a repairable fault occurs but repairing fails, and a read request processing unit 52 configured to query, each time a request for reading data is received, whether the storage unit corresponding to the recorded information about the storage unit stores a part or all of the data, and if yes, return, to a requesting party that sends the request, a message indicating that reading the data fails, or otherwise, read the data from a storage unit that stores the data, and feedback the data to a requesting party that sends the request.

Figure 6:
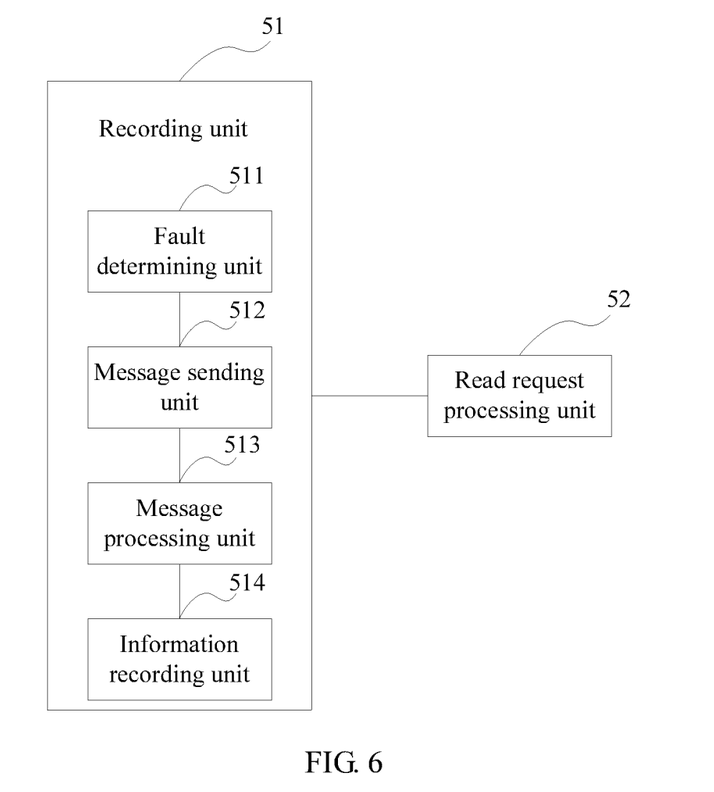
FIG. 6 is another schematic structural diagram of a server device according to an embodiment of the present disclosure.

Preferably, referring to FIG. 6, the recording unit 51 includes a fault determining unit 511 configured to determine a local storage unit in which a repairable fault occurs, a message sending unit 512 configured to send a message to another server in order to request the other server to read backup data of data stored in the storage unit in which the repairable fault occurs, a message processing unit 513 configured to determine, after a message that the other server returns when failing to read the backup data is received, that repairing fails in the storage unit in which the repairable fault occurs, and an information recording unit 514 configured to record the information about the storage unit in which the repairable fault occurs.

Preferably, the fault determining unit 511 is further configured to receive a request for reading data, access, through an OS IO channel, a storage unit in which the data requested to be read is located, and determine, according to a message reported by the OS IO, a storage unit in which a repairable fault occurs in the storage unit in which the data requested to be read is located.

Preferably, the message that is reported by the OS IO channel and received by the fault determining unit 511 includes a bitmap corresponding to the storage unit in which the repairable fault occurs, and error code of the repairable fault.

Preferably, when the recording unit 51 is configured to record the information about the storage unit in which the repairable fault occurs but repairing fails, the recording unit 51 is further configured to set a bit in a BST of memory to 1, where the bit corresponds to the storage unit in which the repairable fault occurs but repairing fails.

Preferably, the device further includes a BST storage unit configured to store the BST of the memory into a hard disk.

Preferably, the repairable fault that occurs in the storage unit corresponding to the information that is about the storage unit and recorded by the recording unit 51 includes a check error and/or a sector identifier error.

Preferably, the device further includes a write request processing unit configured to determine, each time a request for writing data is received, a storage unit into which the data is to be written, and query whether the storage unit corresponding to the recorded information about the storage unit includes the storage unit into which the data is to be written, and if yes, delete a record of information about the storage unit into which the data is to be written, and write the data into the storage unit into which the data is to be written, or otherwise, write the data into the storage unit into which the data is to be written.

Preferably, the device further includes an indication unit (not shown) configured to query, when it is determined to send data to any server, whether the storage unit corresponding to the recorded information about the storage unit stores a part or all of the data that is to be sent, and if yes, send an indication message to a server of a receiving party in order to indicate that a repairable fault occurs but repairing fails in the storage unit that stores the part or all of the data that is to be sent, or otherwise, send, to a server of a receiving party, the data that is to be sent.

Preferably, the device further includes an indication receiving unit (not shown) configured to, when it is determined to receive data sent by any server, if a message that is sent by a server of a sending party and indicates that a repairable fault occurs but repairing fails in a storage unit that is of the server of the sending party and stores a part or all of the data is received, locally record information about the storage unit corresponding to the part or all of the data.

It should be noted that the server device in this embodiment is configured to implement the foregoing steps S101 and S102. The foregoing explanation and limitation for the method are also applicable to the server device in this embodiment.

Figure 7:
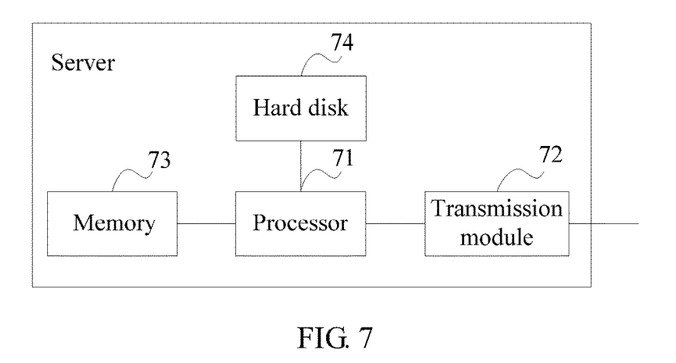
FIG. 7 is another schematic structural diagram of a server device according to an embodiment of the present disclosure.

Referring to FIG. 7, a server provided in an embodiment of the present disclosure includes a processor 71 configured to record, for at least one storage unit used to store data, information about a storage unit in which a repairable fault occurs but repairing fails, query, each time a request for reading data is received, whether the storage unit corresponding to the recorded information about the storage unit stores a part or all of the data, and if yes, return, to a requesting party that sends the request, a message indicating that reading the data fails, or otherwise, read the data from a storage unit that stores the data, and feedback the data to a requesting party that sends the request.

Preferably, the server further includes a transmission module 72, and when the processor 71 is configured to record the information about the storage unit in which the repairable fault occurs but repairing fails, the processor 71 is further configured to determine a local storage unit in which a repairable fault occurs, send a message to another server using the transmission module 72 in order to request the other server to read backup data of data stored in the storage unit in which the repairable fault occurs, receive, using the transmission module 72, a message returned by the other server, determine, after a message that the other server returns when failing to read the backup data is received, that repairing fails in the storage unit in which the repairable fault occurs, and record the information about the storage unit in which the repairable fault occurs.

Preferably, when the processor 71 is configured to determine the local storage unit in which the repairable fault occurs, the processor 71 is further configured to receive a request for reading data, access, through an OS IO channel, a storage unit in which the data requested to be read is located, and determine, according to a message reported by the OS IO, a storage unit in which a repairable fault occurs in the storage unit in which the data requested to be read is located.

Preferably, the message that is reported by the OS IO channel and received by the processor 71 includes a bitmap corresponding to the storage unit in which the repairable fault occurs, and error code of the repairable fault.

Preferably, the server further includes memory 73, and when the processor 71 is configured to record the information about the storage unit in which the repairable fault occurs but repairing fails, the processor 71 is further configured to set a bit in a BST of the memory 73 to 1, where the bit corresponds to the storage unit in which the repairable fault occurs but repairing fails.

Preferably, the server further includes a hard disk 74, and the processor 71 is further configured to store the BST of the memory 73 into the hard disk 74.

Preferably, the repairable fault that occurs in the storage unit corresponding to the information that is about the storage unit and recorded by the processor 71 includes a check error and/or a sector identifier error.

Preferably, the processor 71 is further configured to determine, each time a request for writing data is received, a storage unit into which the data is to be written, and query whether the storage unit corresponding to the recorded information about the storage unit includes the storage unit into which the data is to be written, and if yes, delete a record of information about the storage unit into which the data is to be written, and write the data into the storage unit into which the data is to be written, or otherwise, write the data into the storage unit into which the data is to be written.

Preferably, the processor 71 is further configured to query, when it is determined to send data to any server, whether the storage unit corresponding to the recorded information about the storage unit stores a part or all of the data that is to be sent, and if yes, send an indication message to a server of a receiving party in order to indicate that a repairable fault occurs but repairing fails in the storage unit that stores the part or all of the data that is to be sent, or otherwise, send, to a server of a receiving party, the data that is to be sent.

Preferably, the processor 71 is further configured to, when it is determined to receive data sent by any server, if a message that is sent by a server of a sending party and indicates that a repairable fault occurs but repairing fails in a storage unit that is of the server of the sending party and stores a part or all of the data is received, locally record information about the storage unit corresponding to the part or all of the data.

Figure 8:
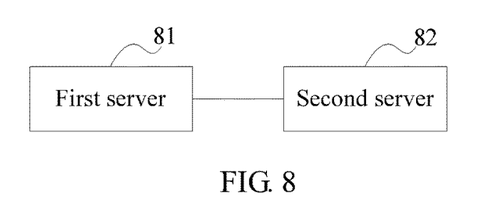
FIG. 8 is a schematic structural diagram of a distributed storage system according to an embodiment of the present disclosure.

Referring to FIG. 8, a distributed storage system provided in an embodiment of the present disclosure includes a first server 81 configured to record, for at least one storage unit used to store data, information about a storage unit in which a repairable fault occurs but repairing fails, query, each time a request for reading data is received, whether the storage unit corresponding to the recorded information about the storage unit stores a part or all of the data, and if yes, return, to a requesting party that sends the request, a message indicating that reading the data fails, or otherwise, read the data from a storage unit that stores the data, and feedback the data to a requesting party that sends the request.

Preferably, for each first server 81, a second server 82 corresponding to the first server 81 exists in the system, and when the first server 81 is configured to record the information about the storage unit in which the repairable fault occurs but repairing fails, the first server 81 is further configured to send a message to the second server 82 in order to request the second server 82 to read backup data of data stored in a storage unit that is in the first server 81 and in which a repairable fault occurs, determine, after a message that the second server 82 returns when failing to read the backup data is received, that repairing fails in the storage unit in which the repairable fault occurs, and record the information about the storage unit in which the repairable fault occurs.

Preferably, the repairable fault that occurs in the storage unit corresponding to the information that is about the storage unit and recorded by the first server 81 includes a check error and/or a sector identifier error.

Preferably, the first server 81 is further configured to query, when it is determined to send data to any server, whether the storage unit corresponding to the recorded information about the storage unit stores a part or all of the data that is to be sent, and if yes, send an indication message to a server of a receiving party in order to indicate that a repairable fault occurs but repairing fails in the storage unit that stores the part or all of the data that is to be sent, or otherwise, send, to a server of a receiving party, the data that is to be sent.

Preferably, the first server 81 is further configured to, when it is determined to receive data sent by any server, if a message that is sent by a server of a sending party and indicates that a repairable fault occurs but repairing fails in a storage unit that is of the server of the sending party and stores a part or all of the data is received, locally record information about the storage unit corresponding to the part or all of the data.

In conclusion, the embodiments of the present disclosure provide a data processing method, device, and system for a storage unit, which improve data read, write, and transmission mechanisms in a storage unit, avoid repeated repairing for data in the storage unit, save a system resource, and avoid that data in a storage unit in which a fault occurs is used by another device.

A person skilled in the art should understand that the embodiments of the present disclosure may be provided as a method, a system, or a computer program product. Therefore, the present disclosure may use a form of hardware only embodiments, software only embodiments, or embodiments with a combination of software and hardware. Moreover, the present disclosure may use a form of a computer program product that is implemented on one or more computer-usable storage media (including but not limited to a disk memory, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine such that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner such that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or any other programmable data processing device such that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

Obviously, a person skilled in the art can make various modifications and variations to the present disclosure without departing from the spirit and scope of the present disclosure. The present disclosure is intended to cover these modifications and variations provided that they fall within the protection scope defined by the following claims and their equivalent technologies.

What is claimed is:

1. A data processing method for a storage unit, comprising:
   recording, by a first server for at least one storage unit used to store data, information about the storage unit in which a repairable fault occurs but repairing fails, wherein the repairable fault comprises at least one of a check error and a sector identifier;
   querying, by the first server, whether the storage unit corresponding to the recorded information about the storage unit stores a part or all of the data when the first server receives a request for reading the data;
   returning, by the first server, to a requesting party that sends the request, a message indicating that reading the data fails when the storage unit corresponding to the recorded information about the storage unit stores the part or all of the data;
   reading, by the first server, the data from another storage unit that stores the data when the storage unit corresponding to the recorded information about the storage unit does not store the part or all of the data;
   sending the data to the requesting party that sends the request;
   determining, by the first server, information about a storage unit into which the data is to be written when the first server receives a request for writing data;
   deleting, by the first server, the recorded information about the storage unit into which the data is to be written when the first server determines that the recorded information about the storage unit comprises the information about the storage unit into which the data is to be written; and
   writing, by the first server, the data into the storage unit.

2. The method according to claim 1, wherein recording, by the first server, the information about the storage unit in which the repairable fault occurs but repairing fails comprises:
   sending, by the first server, a message to a second server in order to request the second server to read backup data of data stored in the storage unit that is in the first server and in which the repairable fault occurs;
   determining that repairing fails in the storage unit in which the repairable fault occurs after the first server receives a message that the second server returns when failing to read the backup data; and
   recording, by the first server, the information about the storage unit in which the repairable fault occurs.

3. The method according to claim 2, wherein determining, by the first server, the storage unit in which the repairable fault occurs, comprises:
   receiving, by the first server, the request for reading the data;
   accessing, by the first server through an operating system (OS) input/output (IO) channel, a storage unit in which the data requested to be read is located; and
   determining, by the first server according to a message reported by the OS IO channel, the storage unit in which the repairable fault occurs in the storage unit in which the data requested to be read is located.

4. The method according to claim 3, wherein the message reported by the OS IO channel comprises a bitmap corresponding to the storage unit in which the repairable fault occurs, and an error code of the repairable fault.

5. The method according to claim 1, wherein recording, by the first server, the information about the storage unit in which the repairable fault occurs but repairing fails comprises setting, by the first server, a bit in a bad sector table (BST) of memory to 1, and wherein the bit corresponds to the storage unit in which the repairable fault occurs but repairing fails.

6. The method according to claim 1, further comprising:
   querying, when the first server determines to send data to any server, whether the storage unit corresponding to the recorded information about the storage unit stores the part or all of the data that is to be sent;
   sending, by the first server, an indication message to a server of a receiving party to indicate that the repairable fault occurs but repairing fails in the storage unit that stores the part or all of the data that is to be sent when the storage unit corresponding to the recorded information about the storage unit does store the part or all of the to-be-sent data; and
   sending, by the first server to the server of the receiving party, the data that is to be sent when the storage unit corresponding to the recorded information about the storage unit does not store the part or all of the to-be-sent data.

7. The method according to claim 1, wherein the storage unit is a portion of a hard disk drive (HDD).

8. The method according to claim 1, wherein the storage unit is a portion of a solid state drive (SSD).

9. A server device, comprising:
   a memory; and
   a processor coupled to the memory and configured to:
      record, for at least one storage unit used to store data, information about a storage unit in which a repairable fault occurs but repairing fails, wherein the repairable fault comprises at least one of a check error and a sector identifier error;
      query, each time a request for reading data is received, whether the storage unit corresponding to the recorded information about the storage unit stores a part or all of the data;
      return, to a requesting party that sends the request, a message indicating that reading the data fails when the storage unit corresponding to the recorded information about the storage unit stores the part or all of the data;
      read the data from another storage unit that stores the data when the storage unit corresponding to the recorded information about the storage unit does not store the part or all of the data;
      send the data to the requesting party that sends the request;
      determine information about a storage unit into which data is to be written when a request for writing the data is received;
      delete the recorded information about the storage unit into which the data is to be written when the recorded information about the storage unit comprises the information about the storage unit into which the data is to be written; and
      write the data into the storage unit.

10. The server device according to claim 9, wherein the processor is further configured to:

determine a local storage unit in which the repairable fault occurs;

send a message to another server in order to request the other server to read backup data of data stored in the storage unit in which the repairable fault occurs;

determine that repairing fails in the storage unit in which the repairable fault occurs after a message that the other server returns when failing to read the backup data is received; and record the information about the storage unit in which the repairable fault occurs.

11. The server device according to claim 10, wherein the processor is further configured to:

receive the request for reading data;

access, through an operating system (OS) input/output (IO) channel, a storage unit in which the data requested to be read is located; and determine, according to a message reported by the OS IO channel, the storage unit in which the repairable fault occurs in the storage unit in which the data requested to be read is located.

12. The server device according to claim 11, wherein the message that is reported by the OS IO channel and received by the processor, comprises a bitmap corresponding to the storage unit in which the repairable fault occurs, and an error code of the repairable fault.

13. The server device according to claim 9, wherein the processor is further configured to set a bit in a bad sector table (BST) of memory to 1 when the processor records the information about the storage unit in which the repairable fault occurs but repairing fails, and wherein the bit corresponds to the storage unit in which the repairable fault occurs but repairing fails.

14. The server device according to claim 9, wherein the processor is further configured to:

query whether the storage unit corresponding to the recorded information about the storage unit stores the part or all of the data that is to be sent when it is determined to send data to any server;

send an indication message to a server of a receiving party in order to indicate that the repairable fault occurs but repairing fails in the storage unit that stores the part or all of the data that is to be sent when the storage unit corresponding to the recorded information about the storage unit stores the part or all of the data that is to be sent; and send, to the server of the receiving party, the data when the storage unit corresponding to the recorded information about the storage unit does not store the part or all of the data that is to be sent.

15. The server device according to claim 9, wherein the memory comprises a hard disk drive (HDD), and wherein the at least one storage unit comprises a portion of the HDD.

16. The server device according to claim 9, wherein the memory comprises a solid state drive (SSD), and wherein the at least one storage unit comprises a portion of the SSD.

17. A distributed storage system, comprising at least a first server, wherein the first server is configured to:

record, for at least one storage unit used to store data, information about a storage unit in which a repairable fault occurs but repairing fails, wherein the repairable fault comprises at least one of a check error and a sector identifier error;

query, each time a request for reading data is received, whether the storage unit corresponding to the recorded information about the storage unit stores a part or all of the data;

return, to a requesting party that sends the request, a message indicating that reading the data fails when the storage unit corresponding to the recorded information about the storage unit stores the part or all of the data;

read the data from another storage unit that stores the data when the storage unit corresponding to the recorded information about the storage unit does not store the part or all of the data;

send the data to the requesting party that sends the request;

determine information about a storage unit into which data is to be written when a request for writing the data is received;

delete the recorded information about the storage unit into which the data is to be written when the recorded information about the storage unit comprises the information about the storage unit into which the data is to be written; and write the data into the storage unit.

18. The system according to claim 17, wherein for each first server, a second server corresponding to the first server exists in the system, and wherein the first server is further configured to:

send a message to the second server in order to request the second server to read backup data of data stored in the storage unit that is in the first server and in which the repairable fault occurs;

determine that repairing fails in the storage unit in which the repairable fault occurs after a message that the second server returns when failing to read the backup data is received; and record the information about the storage unit in which the repairable fault occurs.

19. The system according to claim 17, wherein the first server is further configured to:

query whether the storage unit corresponding to the recorded information about the storage unit stores the part or all of the data that is to be sent when it is determined to send data to any server;

send an indication message to a server of a receiving party in order to indicate that the repairable fault occurs but repairing fails in the storage unit that stores the part or all of the data that is to be sent when the storage unit corresponding to the recorded information about the storage unit stores the part or all of the to-be-sent data; and send, to the server of the receiving party, the data that is to be sent when the storage unit corresponding to the recorded information about the storage unit does not store the part or all of the to-be-sent data.

20. The system according to claim 17, wherein the first server comprises a hard disk drive (HDD) or a solid state drive (SSD), and wherein the storage unit comprises a portion of the HDD or the SSD.

* * * * *